US006704351B1

United States Patent
Ott et al.

(10) Patent No.: US 6,704,351 B1
(45) Date of Patent: Mar. 9, 2004

(54) METHOD AND SYSTEM FOR TRAINING A MODEM

(75) Inventors: Christopher C. Ott, Briarcliff, TX (US); G. Wayne Brush, Round Rock, TX (US); Michael F. Biskobing, Leander, TX (US)

(73) Assignee: Cisco Technology, Inc., San Jose, CA (US)

(*) Notice: Subject to any disclaimer, the term of this patent is extended or adjusted under 35 U.S.C. 154(b) by 642 days.

(21) Appl. No.: 09/595,616

(22) Filed: Jun. 16, 2000

(51) Int. Cl.[7] .................................................. H04B 1/38
(52) U.S. Cl. .......................... 375/222; 375/224; 375/335; 370/465
(58) Field of Search ................................ 375/222, 224, 375/335; 370/465

(56) References Cited

U.S. PATENT DOCUMENTS

| | | | |
|---|---|---|---|
| 4,663,766 A | * 5/1987 | Bremer ..................... 375/225 |
| 5,265,151 A | * 11/1993 | Goldstein ................ 379/93.32 |
| 5,987,061 A | 11/1999 | Chen ......................... 375/222 |
| 5,987,069 A | * 11/1999 | Furukawa et al. .......... 375/285 |
| 5,999,540 A | 12/1999 | McGhee ..................... 370/465 |
| 5,999,563 A | 12/1999 | Polley et al. ............... 375/222 |
| 6,002,722 A | 12/1999 | Wu ............................ 375/295 |
| 6,021,167 A | 2/2000 | Wu ............................ 375/354 |
| 6,038,251 A | 3/2000 | Chen ......................... 375/222 |
| 6,044,107 A | 3/2000 | Gatherer et al. ........... 375/222 |
| 6,055,268 A | 4/2000 | Timm et al. ................ 375/229 |
| 6,233,604 B1 | 5/2001 | Van Horne et al. ......... 709/203 |
| 6,272,108 B1 | 8/2001 | Chapman .................... 370/226 |
| 6,345,071 B1 | 2/2002 | Hamdi ........................ 375/222 |
| 6,385,203 B2 | 5/2002 | McHale et al. ............. 370/401 |
| 6,389,065 B1 | * 5/2002 | McGhee ..................... 375/222 |
| 6,400,759 B1 | 6/2002 | Liu et al. ................... 375/222 |
| 6,507,565 B1 | 1/2003 | Taylor ........................ 370/252 |
| 6,535,551 B1 | 3/2003 | Sweitzer et al. ........... 375/225 |
| 6,539,081 B2 | 3/2003 | Zakrzewski et al. ..... 379/93.32 |
| 6,546,046 B1 | * 4/2003 | Sweitzer .................... 375/225 |
| 6,566,889 B2 | 5/2003 | Warke ........................ 324/527 |
| 6,567,464 B2 | 5/2003 | Hamdi ........................ 375/222 |
| 6,570,915 B1 | 5/2003 | Sweitzer et al. ........... 375/225 |

OTHER PUBLICATIONS

N. Warke and M. Ali, Optimum Codec Companding High-Speed PCM Data Transmission in Telephone Networks, IEEE, Acoustics, Speech and Signal Processing, 1999, vol. 5, pp. 2679–2682.*

* cited by examiner

Primary Examiner—Don N. Vo
Assistant Examiner—Qutub Ghulamali
(74) Attorney, Agent, or Firm—Baker Botts L.L.P.

(57) ABSTRACT

A method for training a modem includes selecting a transmission rate from one of a plurality of bauds, each baud identifying at least one transmission rate. The method also includes attempting to train the modem at the transmission rate and measuring the signal quality after the modem trains. The method further includes accessing a table of acceptable signal qualities, the table corresponding to the baud of the first transmission rate. In addition, the method includes comparing the measured signal quality to at least one acceptable signal quality identified by a provisioned margin in the table to determine if the measured signal quality is acceptable.

51 Claims, 10 Drawing Sheets

140a

| 136K BAUD (AT 952K DS) | |
|---|---|
| BIT RATE (IN 1000s) | CONSTELLATION |
| 1,088 | 256U |
| 952 | 256 |
| 680 | 64 |
| 408 | 16 |

140b

| 136K BAUD (AT 680K DS) | |
|---|---|
| BIT RATE (IN 1000s) | CONSTELLATION |
| 1,088 | 256U |
| 952 | 256 |
| 680 | 64 |
| 408 | 16 |

140c

| 136K BAUD (AT 340K DS) | |
|---|---|
| BIT RATE (IN 1000s) | CONSTELLATION |
| 1,088 | 256U |
| 952 | 256 |
| 816 | 128 |
| 680 | 64 |
| 544 | 32 |
| 408 | 16 |
| 272 | 8 |
| 90.6 | 8ER |

140e (142, 144, 146)

| 68K BAUD (AT 340K DS) | |
|---|---|
| BIT RATE (IN 1000s) | CONSTELLATION |
| 544 | 256U |
| 476 | 256 |
| 408 | 128 |
| 340 | 64 |
| 272 | 32 |
| 204 | 16 |
| 136 | 8 |
| 45.3 | 8ER |

140d

| 136K BAUD (AT 136K DS) | |
|---|---|
| BIT RATE (IN 1000s) | CONSTELLATION |
| 1,088 | 256U |
| 952 | 256 |
| 816 | 128 |
| 680 | 64 |
| 544 | 32 |
| 408 | 16 |
| 272 | 8 |
| 90.6 | 8ER |

140f

| 68K BAUD (AT 136K DS) | |
|---|---|
| BIT RATE (IN 1000s) | CONSTELLATION |
| 544 | 256U |
| 476 | 256 |
| 408 | 128 |
| 340 | 64 |
| 272 | 32 |
| 204 | 16 |
| 136 | 8 |
| 45.3 | 8ER |

140g

| 17K BAUD (AT 136K DS) | |
|---|---|
| BIT RATE (IN 1000s) | CONSTELLATION |
| 136 | 256U |
| 119 | 256 |
| 102 | 128 |
| 85 | 64 |
| 68 | 32 |
| 51 | 16 |
| 34 | 8 |
| 11.3 | 8ER |

FIG. 4b

METHOD AND SYSTEM FOR TRAINING A MODEM

TECHNICAL FIELD OF THE INVENTION

This invention relates generally to data communication and, more particularly, to a method and system for training a modem.

BACKGROUND OF THE INVENTION

Digital Subscriber Line (DSL) technology allows subscribers to transmit both data and voice signals over the same twisted-pair copper telephone lines. DSL technology utilizes modems at the subscriber's location and at a remote location, such as a central office of a service provider. These modems facilitate the communication of both voice and data between the subscriber and the central office.

A problem that arises with the use of DSL technology is that the data transmission rates for DSL connections vary depending on a wide variety of factors. For example, the transmission rate in one DSL connection may decrease because of interference caused by another DSL connection, electrical interference caused by lightning, and other variations in the condition of the copper lines. Because of this, the transmission rate achieved over a copper line at one time may not be available over the same copper line at another time. The same subscriber typically cannot receive a consistent transmission rate.

Before the DSL modems at the subscriber's location and the central office begin transmitting data to one another, DSL chipsets in the modems typically enter a "training mode." While in training mode, the chipsets perform handshaking operations and attempt to negotiate rates for data transmissions between the modems. The chipsets typically attempt to negotiate transmission rates for both an upstream direction (away from the subscriber's location) and a downstream direction (toward the subscriber's location). The chipsets may attempt to train the modems using certain transmission rates, and if that attempt fails the chipsets try again using different rates.

Conventional DSL chipsets rely heavily on systems using a plurality of tables to train the modems. For example, in DSL modems that use Carrierless Amplitude and Phase (CAP) modulation, the DSL chipsets typically use four-dimensional tables, or tables having four variables, to select transmission rates. The four dimensions in the tables are usually baud rate, signal quality, receiver gain, and desired margin. The baud rate identifies different modulation rates of signals communicated between the modems. The signal quality describes the quality of the signals transmitted between the DSL modems, and lower signal qualities typically represent higher-quality connections. The receiver gain identifies the strength of the signal received by the subscriber's modem and how much that signal needs to be amplified. The desired margin describes the modems' ability to correct errors during data transfers before the errors excessively affect the transmission rate. Each entry in these four-dimensional tables also usually includes multiple values. These multiple values identify the upstream and downstream bauds and transmission rates that should be used by the chipsets if the current training attempt fails.

A problem with conventional approaches to training a modem is that these four-dimensional tables take an excessive amount of time to develop. These tables often include a large number of entries, and each entry includes multiple values. Before programming these tables into the memories of the DSL modems, the values are usually determined and then entered into a master table by a programmer. Because there are a large number of values in these tables, determining the values and programming them into the master table may take an excessive amount of time, such as up to several weeks or more.

Another problem with conventional approaches to training a modem is that the tables are also difficult to maintain. For example, in order to upgrade the values in the tables, the updated values are usually determined and then programmed into a master table. It takes time to determine the values and program them into the table. It may also be difficult and time-consuming to locate and replace the old values in the master table.

In addition, the conventional approaches to training a modem usually require a large amount of memory. The values in the four-dimensional tables require storage space. Because of the large number of values in the tables, the tables may require up to 32 kilobytes of memory or more. The DSL modems typically need larger and more expensive memories to store the tables, which also increases the overall size and cost of the modems.

SUMMARY OF THE INVENTION

A need has arisen for an improved method and system for training a modem. The present invention provides a method and system for training a modem that addresses shortcomings of prior systems and methods.

In accordance with one embodiment of the present invention, a modem comprises an interface operable to communicate over a subscriber line and a memory operable to store at least one table of acceptable signal qualities. The modem also includes a chipset coupled to the interface. The chipset is operable to train the modem and measure a signal quality after the modem trains. The modem further includes a processor coupled to the chipset and the memory. The processor is operable to select a transmission rate from one of a plurality of bauds, each baud identifying at least one transmission rate. The processor is also operable to communicate the transmission rate to the chipset, where the chipset is operable to attempt to train the modem at the transmission rate. The processor is further operable to receive a measured signal quality from the chipset after the modem trains, and access the table of acceptable signal qualities, the table corresponding to the baud of the transmission rate. In addition, the processor is operable to compare the measured signal quality to at least one acceptable signal quality identified by a provisioned margin in the table to determine if the measured signal quality is acceptable.

In accordance with another embodiment of the present invention, a method for training a modem comprises selecting a transmission rate from one of a plurality of bauds, each baud identifying at least one transmission rate. The method also comprises attempting to train the modem at the transmission rate and measuring the signal quality after the modem trains. The method further comprises accessing a table of acceptable signal qualities, the table corresponding to the baud of the transmission rate. In addition, the method comprises comparing the measured signal quality to at least one acceptable signal quality identified by a provisioned margin in the table to determine if the measured signal quality is acceptable.

Embodiments of the invention provide numerous technical advantages. For example, in one embodiment of the invention, a modem is provided that uses simple tables, such as a plurality of two-dimensional tables, to train the DSL modems. This reduces the number of entries contained in the tables. Also, each entry may contain fewer values, such as only a single value in each entry. This further reduces the overall number of values in the tables. Because there are fewer values in the tables, the values may be determined and programmed into a master table in a shorter amount of time.

Some embodiments of the invention also provide tables that are easier to maintain. Because there are fewer values to update in the tables, determining all of the updated values takes less time. Also, the tables are simpler, so it may be easier to locate and replace the old values in the existing master table.

In addition, some embodiments of the invention require smaller amounts of memory to store the tables. Because the tables have fewer entries and each entry contains fewer values, the tables require less storage space. For example, in one embodiment of the invention, the tables may require approximately 750 bytes of storage space or even less. This allows the DSL modems to use smaller memories to store the tables, which also decreases the overall size and cost of the modems.

Other technical advantages are readily apparent to one of skill in the art from the attached Figures, description, and claims.

BRIEF DESCRIPTION OF THE DRAWINGS

For a more complete understanding of the present invention and the advantages thereof, reference is now made to the following descriptions taken in connection with the accompanying drawings, in which:

FIGS. 4a and 4b are block diagrams illustrating example bauds used to train the DSL modems of FIG. 1;

FIG. 5 is a block diagram illustrating an example signal quality table used to train the DSL modems of FIG. 1;

FIGS. 7b through 7f are flowcharts illustrating an example method for processing a training attempt of FIG. 7a; and FIG. 7g is a flowchart illustrating an example method for processing an unsuccessful downstream training attempt of FIG. 7a.

DETAILED DESCRIPTION OF EXAMPLE EMBODIMENTS OF THE INVENTION

Example embodiments of the invention are best understood by referring to FIGS. 1 through 7 of the drawings, like numerals being used for like and corresponding parts of the various drawings.

Figure 1:
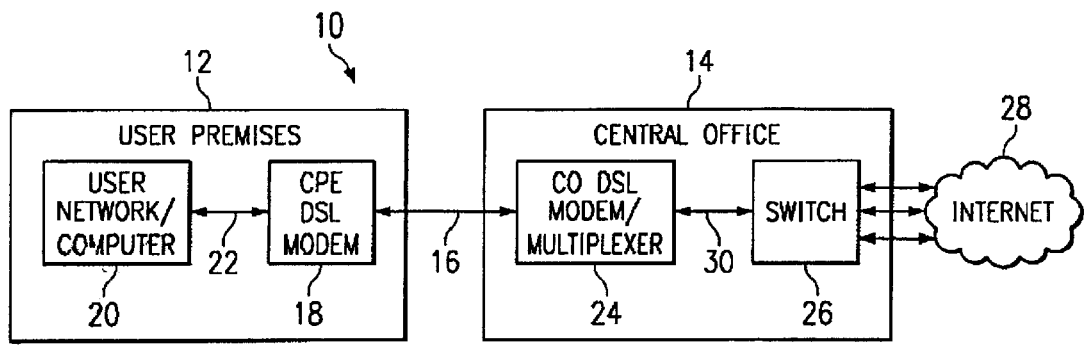
FIG. 1 is a block diagram illustrating a communications network according to the teachings of the present invention.

FIG. 1 is a block diagram illustrating a communications network 10 according to the teachings of the present invention. Network 10 connects a user premises 12 to a telephone company central office 14 via a subscriber line 16. User premises 12 is a location at which a subscriber, such as a business or a home computer user, maintains a computer for accessing the Internet or other network 28. User premises 12 includes a digital subscriber line (DSL) modem 18 and a user computer 20.

Although the present invention is described in the context of digital subscriber line technology, other embodiments may be used without departing from the scope of the present invention. For example, the present invention may be used in any system that supports the use of a rate-adaptive modem for data communications.

DSL modem 18 communicates data between subscriber line 16 and user computer 20. This data communication may include, for example, performing voice and data separation, which allows communication over subscriber line 16 in both a voice channel and a data channel. This data communication may also include channel separation, which splits the data channel into an upstream data channel and a downstream data channel. The upstream channel transfers data from user premises 12 to central office 14, and the downstream channel transfers data from central office 14 to user premises 12. This data communication may further include operations to encode and decode data onto a single carrier frequency. In one embodiment, DSL modem 18 performs Carrierless Amplitude and Phase (CAP) modulation encoding and decoding operations. CAP modulation encodes multiple bits onto the carrier frequency. The number or density of the bits is referred to as a "constellation," and higher constellations typically correspond to higher transmission rates. DSL modem 18 may support communications using different constellations.

Each subscriber who receives DSL service typically has provisioned data transmission rates and a provisioned margin. The provisioned data transmission rates define the maximum upstream and downstream transmission rates that a subscriber is authorized to receive. The provisioned margin describes the ability of network 10 to correct errors during this subscriber's data transfers before the errors excessively affect the transmission rates. In one embodiment, the quality of DSL service increases as the margin increases.

A communication link 22 connects DSL modem 18 to user computer 20. Communication link 22 is operable to communicate data between DSL modem 18 and user computer 20. Example communication links 22 include Ethernet communication links, local area network (LAN) communication links, and asynchronous transfer mode (ATM) communication links.

Subscriber line 16 couples user premises 12 and central office 14. In this document, the term "couple" refers to any direct or indirect connection between two or more elements in network 10, whether those elements physically contact one another or not. Subscriber line 16 is operable to facilitate the transfer of voice and data signals between user premises 12 and central office 14. Subscriber line 16 may comprise any suitable link operable to facilitate communication between user premises 12 and central office 14. Subscriber line 16 may, for example, comprise a twisted-pair phone line.

Central office 14 provides communication of data between subscriber line 16 and network 28. Central office 14 includes a DSL modem and access multiplexer (referred to collectively as "DSL modem") 24 and a switch 26. DSL modem 24 permits communication between subscriber line 16 and switch 26 by performing voice and data separation, channel separation, and encoding and decoding operations. DSL modem 24 also provides multiplexing capability, allowing signals to be transmitted to and received from multiple subscriber lines 16 and combined into a single signal for transmission on a high-speed backbone line 30.

Switch 26 is operable to facilitate communication between DSL modem 24 and network 28. Switch 26 transmits and receives signals to and from DSL modem 24 over high-speed backbone line 30. Switch 26 also forwards and receives data signals to and from network 28. Switch 26 may comprise any suitable switch operable to facilitate communication between DSL modem 24 and network 28. Switch 26 may, for example, comprise an ATM switch.

Network 28 is coupled to switch 26. Network 28 comprises any suitable network that may communicate with user premises 12. Network 28 may, for example, include a global network such as the Internet. Network 28 may also comprise any suitable local area network (LAN), metropolitan area network (MAN), wide area network (WAN), or other communications system or systems at one or multiple locations.

In one aspect of operation, DSL modems 18 and 24 communicate using signals that have a modulation rate, which is also called a "baud rate" or a "baud." Different bauds may be used in network 10, and each baud may support different transmission rates. While in a "training mode," system 10 attempts to train DSL modems 18 and 24. In this document, the term "train" refers to establishing a connection between DSL modems 18 and 24 using transmission rates from the various bauds for the upstream and downstream directions. In training mode, DSL modems 18 and 24 may, for example, attempt to identify the fastest transmission rates available to a subscriber that provide a desired margin. DSL modems 18 and 24 then use those selected bauds and transmission rates to communicate in the upstream and downstream directions.

In one embodiment, DSL modem 18 and/or DSL modem 24 uses at least one signal quality table to select the bauds and transmission rates. In a particular embodiment, the signal quality table identifies acceptable signal quality levels for different constellations or transmission rates at different margins. While in training mode, after DSL modems 18 and 24 establish a connection over subscriber line 16, DSL modem 18 and/or 24 measures the signal quality of the connection in one or both directions. DSL modem 18 and/or 24 compares the measured signal quality level to at least one entry in the signal quality table to determine if the existing DSL connection provides an acceptable signal quality.

Additional details of DSL modem 24 are described in greater detail below in connection with FIGS. 2 through 5. Methods for training DSL modems 18 and 24 are described in greater detail below in conjunction with FIGS. 6 and 7.

Figure 2:
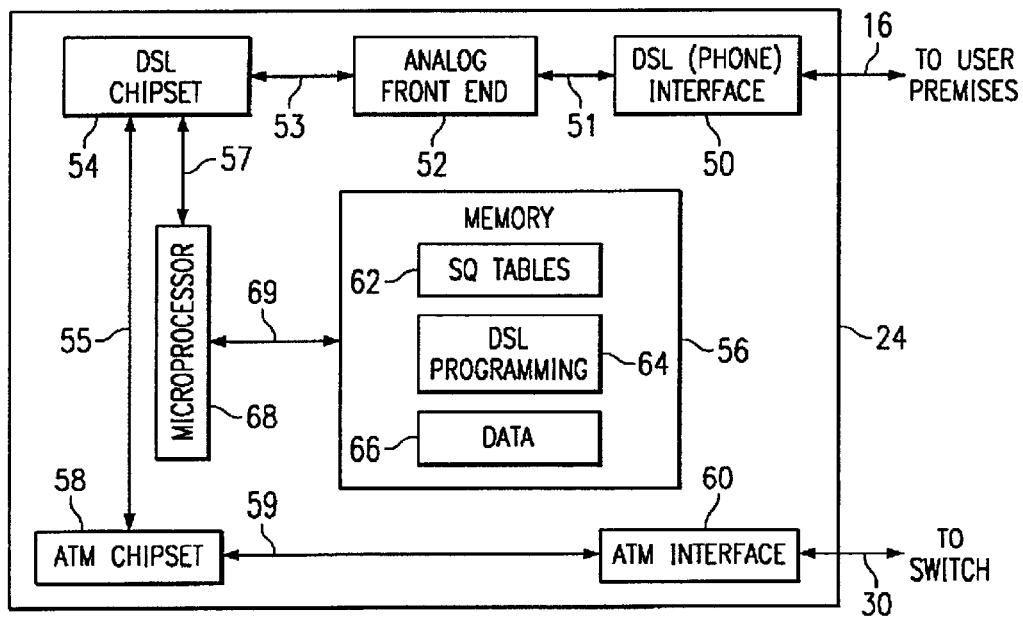
FIG. 2 is a block diagram illustrating a digital subscriber line (DSL) modem of FIG. 1.

FIG. 2 is a block diagram illustrating DSL modem 24 of FIG. 1. In the illustrated embodiment, DSL modem 24 includes a DSL interface 50, an analog front end 52, a DSL chipset 54, a memory 56, an asynchronous transfer mode (ATM) chipset 58, an ATM interface 60, and a microprocessor 68.

DSL interface 50 provides an interface between subscribe line 16 and analog front end 52. Data may be communicated between DSL interface 50 and analog front end 52 over line 51. Analog front end 52 provides communication between DSL chipset 54 and DSL interface 50 over lines 51 and 53. DSL chipset 54 provides communication between analog front end 52 and ATM chipset 58 over lines 53 and 55. DSL chipset 54 also communicates with microprocessor 68 over line 57 to train DSL modems 18 and 24. In addition, DSL chipset 54 operates to perform voice and data separation, channel separation, and encoding/decoding of data. As described above, DSL chipset 54 may implement any suitable modulation technique, including CAP modulation.

Memory 56 is utilized by microprocessor 68 to train DSL modems 18 and 24. Memory 56 includes at least one signal quality table 62, a DSL programming portion 64, and a data portion 66. DSL programming portion 64 stores programming related to training DSL modems 18 and 24, and signal quality tables 62 are used by microprocessor 68 to train DSL modems 18 and 24. Data portion 66 is used by microprocessor 68 to store information.

ATM chipset 58 operates to convert signals received from DSL chipset over line 55 into a format suitable for use by switch 26. ATM chipset 58 also operates to convert signals received from switch 26 over line 59 to a format suitable for DSL chipset 54. ATM interface 60 provides an interface between ATM chipset 58 and switch 26. While DSL modem 24 is described as comprising ATM chipset 58 and ATM interface 60, other types of chipsets and interfaces may be used depending on the type of switch 26 used in central office 14.

Microprocessor 68 communicates with DSL chipset 54 over line 57 and with memory 58 over line 69. Microprocessor 68 executes the training algorithm stored in DSL programming portion 64 to train DSL modems 18 and 24. Microprocessor 68 may, for example, select transmission rates that DSL chipset 54 uses to attempt to train DSL modems 18 and 24. If the modems train, DSL chipset 54 measures the signal quality of the connection, and microprocessor 68 uses the measured signal quality and signal quality tables 62 to determine if the current training attempt is successful. Microprocessor 68 may comprise any suitable processor. In another embodiment, DSL chipset 54 performs the functions of microprocessor 68. DSL chipset 54 executes the training algorithm in DSL programming portion 64.

Figure 3:
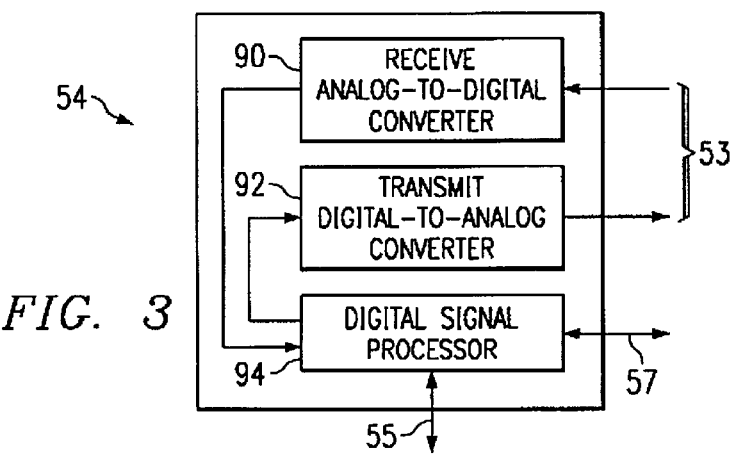
FIG. 3 is a block diagram illustrating a DSL chipset of the DSL modem of FIG. 2.

FIG. 3 is a block diagram illustrating DSL chipset 54 of DSL modem 24 of FIG. 2. In the illustrated embodiment, DSL chipset 54 includes a receive analog-to-digital converter 90, a transmit digital-to-analog converter 92, and a digital signal processor 94. Receive analog-to-digital converter 90 converts an analog signal received over line 53 from analog front end 52 to a digital format for processing by digital signal processor 94. Transmit digital-to-analog converter 92 converts digital signals received from digital signal processor 94 to analog signals for transmission over line 53 to analog front end 52. Digital signal processor 94 receives digital data from ATM chipset 58 over line 55. Digital signal processor 94 performs operations on data received from ATM chipset 58 over line 55 and from analog front end 52 over line 53 to effect voice and data separation, channel separation, and encoding or decoding of data.

Digital signal processor 94 also communicates with microprocessor 68 over line 57. Digital signal processor 94 may receive transmission rates from microprocessor 68, and digital signal processor 94 attempts to train DSL modems 18 and 24 at those transmission rates. If the modems train, digital signal processor 94 measures the signal quality of the connection. Digital signal processor 94 communicates the measured signal qualities to microprocessor 68, and microprocessor 68 accesses signal quality table 62 to determine if the measured signal quality is acceptable.

Figures 4A, 5:
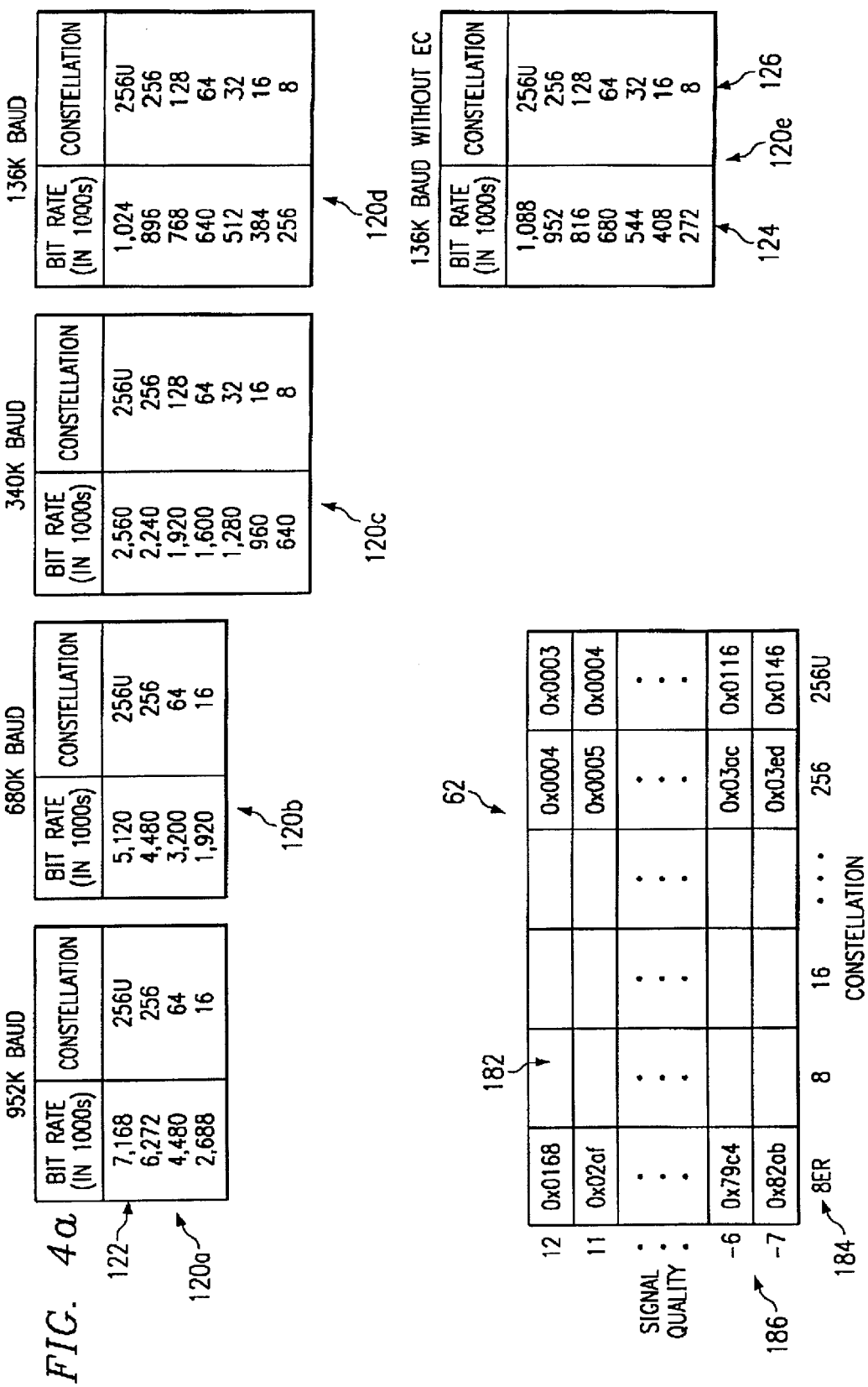

FIGS. 4a and 4b are block diagrams illustrating example bauds 120 and 140 used to train DSL modems 18 and 24 of FIG. 1. Bauds 120 and 140 identify the modulation rates that are supported by DSL modems 18 and 24, and each baud contains transmission rates and constellations supported by that baud. Microprocessor 68 uses bauds 120 and 140 to train DSL modems 18 and 24 at the different transmission rates. The values for the transmission rates and constellations shown in FIGS. 4a and 4b are for illustration only. Other suitable transmission rates and constellations may be used without departing from the scope of the present invention.

FIG. 4a illustrates example downstream bauds 120a–120e. In the illustrated embodiment, each baud 120 includes at least one entry 122, and each entry 122 contains a transmission rate 124 and a constellation 126. Each entry 122 in baud 120 represents a downstream transmission rate 124 and constellation 126 that are supported by that baud 120. For example, baud 120a corresponds to a 952 kHz baud, which supports transmission rates of between 2.688 megabits per second and 7.168 megabits per second. Baud 120b corresponds to a 680 kHz baud, and baud 120c corresponds to a 340 kHz baud. Bauds 120d and 120e both correspond to a 136 kHz baud, but baud 120e contains transmission rates supported without an error correction algorithm, such as a Reed-Solomon error correction scheme.

FIG. 4b illustrates example upstream bauds 140a–140g. In the illustrated embodiment, each baud 140 includes at least one entry 142, each entry 142 containing a transmission rate 144 and a constellation 146. Each entry 142 in baud 140 represents an upstream transmission rate 144 and constellation 146 that are supported by baud 140. Baud 140a corresponds to a 136 kHz baud, which supports transmission rates of between 408 kilobits per second and 1.088 megabits per second. Bauds 140b, 140c, and 140d also correspond to a 136 kHz baud. Bauds 140e and 140f correspond to a 68 kHz baud, and baud 140g corresponds to a 17 kHz baud.

At least one upstream baud 140 corresponds to each downstream baud 120. In the illustrated embodiment, baud 140a is associated with baud 120a, and baud 140b is associated with baud 120b. Bauds 140c and 140e are both associated with baud 120c, and bauds 140d, 140f, and 140g correspond to bauds 120d and 120e.

In one embodiment of network 10, the upstream transmission rates 144 available to DSL modems 18 and 24 during a training session are limited by the downstream transmission rate 124 used by DSL modems 18 and 24. In this embodiment, the baud 120 of the current downstream rate 124 defines which bauds 140 are available, and DSL modems 18 and 24 may select upstream transmission rates 144 from those upstream bauds 140. If, for example, DSL modems 18 and 24 use a downstream rate from baud 120a, DSL modems 18 and 24 may select an upstream rate from baud 140a. Similarly, if DSL modems 18 and 24 use a downstream rate from baud 120b, DSL modems 18 and 24 may choose an upstream rate from baud 140b. When DSL modems 18 and 24 use a downstream rate from baud 120c, DSL modems 18 and 24 may select an upstream rate from either baud 140c or 140e. When DSL modems 18 and 24 use a downstream rate from baud 120d or 120e, DSL modems 18 and 24 may choose an upstream rate from baud 140d, 140f, or 140g.

Each entry 122 and 142 in bauds 120 and 140 may also include a tag or a marker. The marker indicates whether DSL chipset 54 previously attempted to train DSL modems 18 and 24 at that transmission rate and constellation. This allows microprocessor 68 to skip transmission rates that already have been tried. Microprocessor 68 may also initialize or reset the markers as needed. For example, DSL modems 18 and 24 may successfully train at a downstream transmission rate but fail to train successfully at a corresponding upstream transmission rate. As a result, microprocessor 68 may select another downstream rate and reset all of the markers for the upstream rates. Although these upstream rates previously failed, DSL modems 18 and 24 may successfully train using the same upstream rates after the downstream rate changes.

FIG. 5 is a block diagram illustrating an example signal quality table 62 used to train DSL modems 18 and 24 of FIG. 1. In the illustrated embodiment, signal quality table 62 includes a plurality of entries 182. Each entry 182 is uniquely identified by a constellation 184 and a margin 186. Constellation 184 ranges from 8ER to 256U, and the margin 186 ranges from −7 to 12. Other suitable constellation or margin ranges may be used in signal quality table 62 without departing from the scope of the present invention.

Each entry 182 in table 62 contains at least one acceptable signal quality value. For a transmission rate that uses constellation 184 and provides margin 186, the value in table 62 represents an acceptable signal quality for that transmission rate. In one embodiment, the signal quality value and the quality of a DSL connection are inversely related, where lower signal quality values represent higher-quality connections. Each entry 182 in table 62 may contain one acceptable signal quality, such as a maximum or a minimum acceptable signal quality. Each entry 182 may also contain multiple acceptable signal qualities, such as both a maximum and a minimum signal quality.

At least one signal quality table 62 corresponds to each downstream baud 120, and at least one signal quality table 62 corresponds to each upstream baud 140. A signal quality table 62 may correspond to one baud, or the same signal quality table 62 may correspond to multiple bauds. In one embodiment, four signal quality tables 62 are used to train DSL modems 18 and 24. One downstream signal quality table 62 and one upstream signal quality table 62 are used when the downstream baud is either 952 kHz or 680 kHz. One downstream signal quality table 62 and one upstream signal quality table 26 are also used when the downstream baud is either 340 kHz or 136 kHz.

While FIG. 5 illustrates constellation 184 and margin 186 indexing entries 182 in table 62, any suitable indices may used in table 62. For example, in another embodiment, transmission rates may be used in place of constellations 184.

Figure 6:
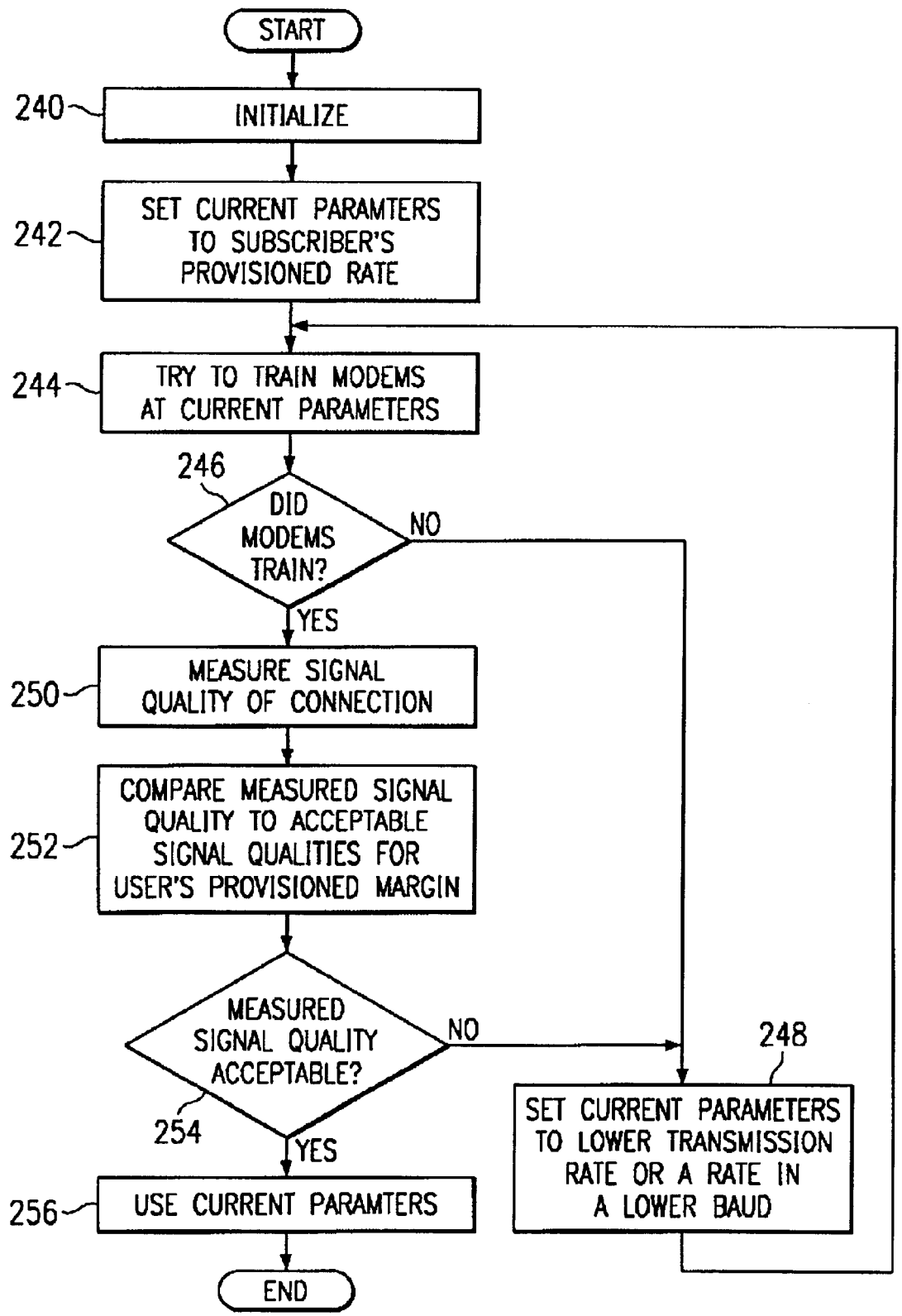
FIG. 6 is a flowchart illustrating an example method for training the DSL modems of FIG. 1.

FIG. 6 is a flowchart illustrating an example method for training DSL modems 18 and 24 of FIG. 1. The method illustrated in FIG. 6 may be used to train DSL modems 18 and 24 in either the upstream or downstream direction.

DSL modem 24 is initialized at a step 240. This may include, for example, microprocessor 68 retrieving signal quality tables 62 and DSL programming 64 from memory 56. Microprocessor 68 establishes current training parameters used to train DSL modems 18 and 24 at a step 242. This may include, for example, microprocessor 68 setting the current parameters to a subscriber's provisioned baud, transmission rate, and constellation. For example, microprocessor 68 may determine that a subscriber is allowed to receive a transmission rate of up to 3.200 megabits per second with a constellation of 64 at a baud of 680 kHz in the downstream direction.

DSL chipset 54 attempts to train DSL modems 18 and 24 at a step 244. This may include, for example, microprocessor 68 transmitting the current parameters to DSL chipset 54, and DSL chipset 54 attempting to train DSL modems 18 and 24 using the current training parameters. DSL chipset 54 determines if DSL modems 18 and 24 trained at a step 246. This may include, for example, determining whether DSL modem 24 successfully entered data mode or remained in training or handshake mode. If DSL modem 24 did not train successfully, microprocessor 68 alters the current training parameters at a step 248. This may include, for example, microprocessor 68 setting the current parameters to a lower transmission rate and constellation in the same baud or to a transmission rate in a lower baud. Microprocessor 68 returns to step 244 and attempts to retrain DSL modem 24 using the modified training parameters.

If DSL modems 18 and 24 trained and entered data mode at step 246, DSL chipset 54 measures the current signal quality of the connection between DSL modems 18 and 24 at a step 250. Microprocessor 68 compares the measured signal quality to at least one entry 182 in signal quality table 62 at a step 252. This may include, for example, microprocessor 68 receiving the measured signal quality from DSL chipset 54 and accessing the signal quality table 62 that corresponds to the baud in the current parameters. Microprocessor 68 also locates the entry 182 in table 62 that is identified by the constellation 184 in the current parameters and the subscriber's provisioned margin. In one embodiment, entry 182 contains the maximum acceptable signal quality for this constellation and margin.

Microprocessor 68 determines whether the measured signal quality is acceptable at a step 254. If the measured signal quality is greater than the acceptable signal quality, the measured signal quality is unacceptable. Microprocessor 68 returns to step 248 and sets the current parameters to a lower transmission rate or to a transmission rate in a lower baud. If the measured signal quality does not exceed the acceptable signal quality from table 62, the signal quality is acceptable. DSL chipset 54 uses the current parameters for this transmission direction (upstream or downstream) to train DSL modems 18 and 24.

Figure 7A:
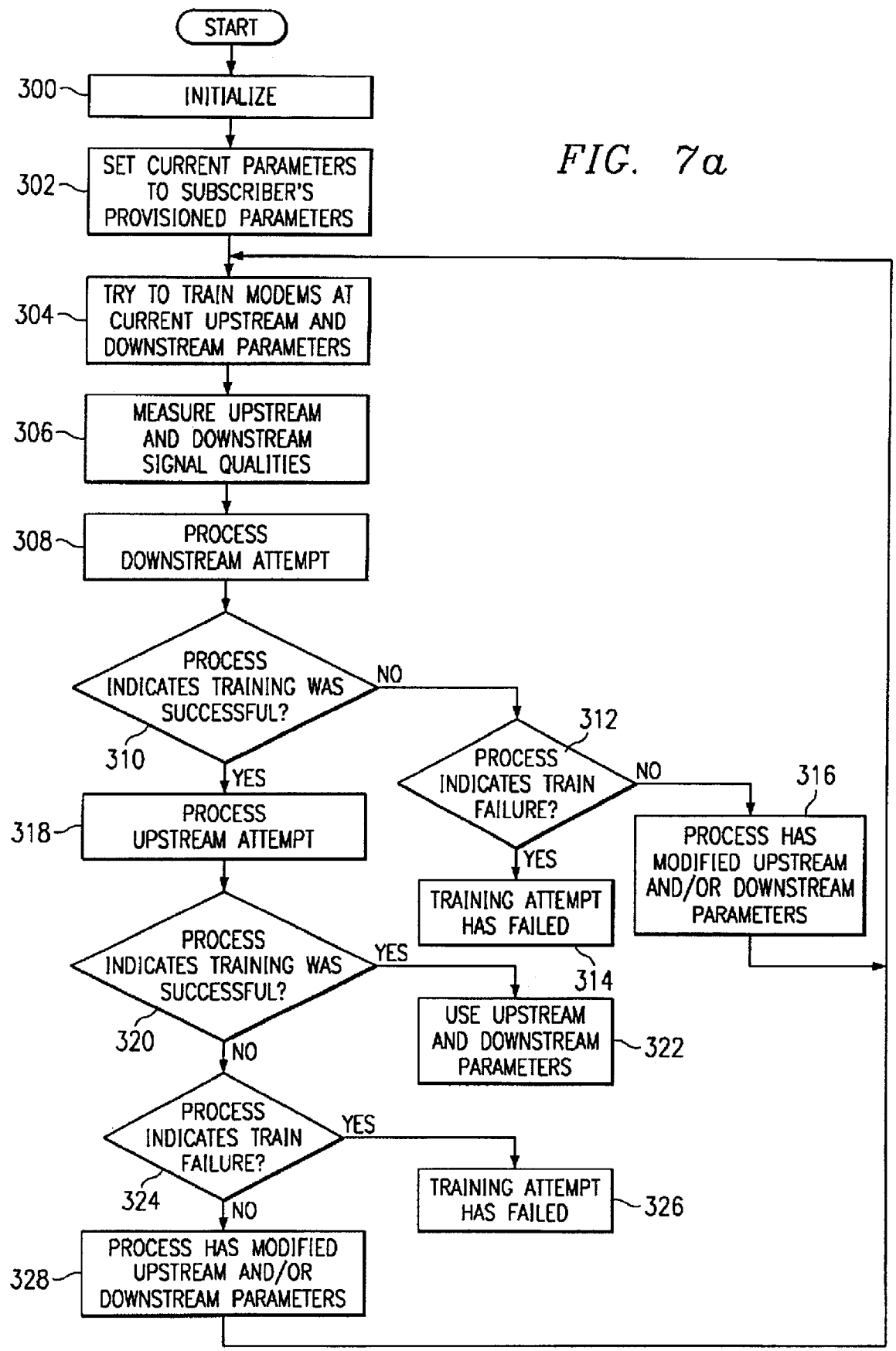
FIG. 7a is a flowchart illustrating another example method for training the DSL modems of FIG. 1.
Figure 7B:
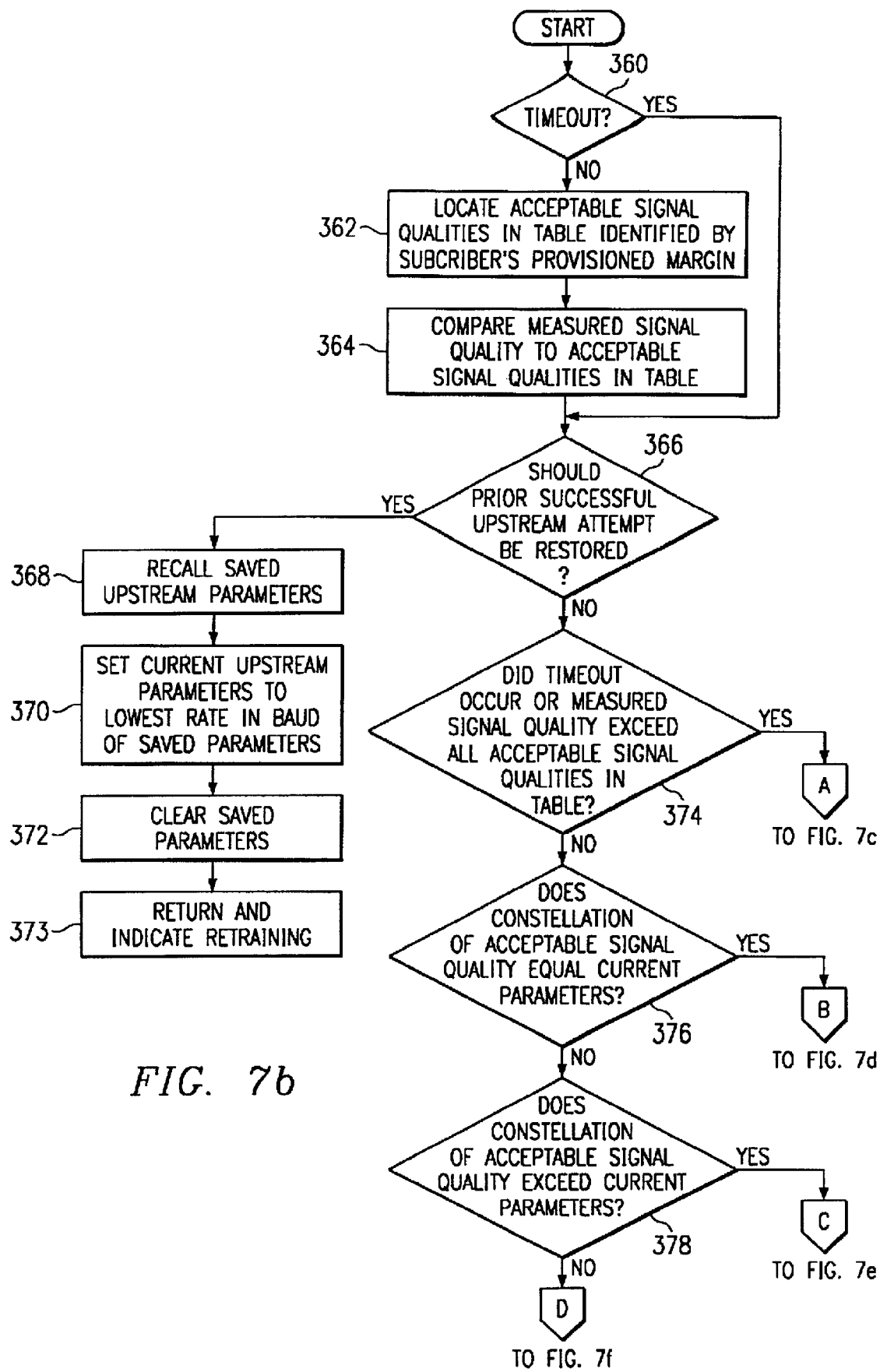

FIG. 7a is a flowchart illustrating another example method for training DSL modems 18 and 24 of FIG. 1. The method illustrated in FIG. 7a may be used to train DSL modems 18 and 24 in both the upstream and downstream directions.

DSL modem 24 is initialized at a step 300. This may include, for example, microprocessor 68 retrieving signal quality tables 62 and DSL programming 64 from memory 56. Microprocessor 68 establishes current training parameters used to train DSL modems 18 and 24 at a step 302. This may include, for example, microprocessor 68 setting the current parameters to a subscriber's provisioned baud, transmission rate, and constellation for both the upstream and downstream directions. DSL chipset 54 attempts to train DSL modems 18 and 24 at a step 304. This may include, for example, microprocessor 68 communicating the current parameters to DSL chipset 54, and DSL chipset 54 training DSL modems 18 and 24 using the current parameters. DSL chipset 54 measures the upstream and downstream signal qualities at a step 306. This may include, for example, DSL chipset 54 determining that DSL modem 24 entered data mode and measuring the signal quality of the resulting connection.

Microprocessor 68 processes the downstream training attempt at a step 308. The process is illustrated in FIGS. 7b–7f, which are described below. The process may indicate that the training attempt successfully established a connection with an acceptable signal quality, that DSL modems 18 and 24 cannot be suitably trained at any transmission rate, or that DSL chipset 54 should retrain DSL modem 24.

Microprocessor 68 determines whether the downstream process indicates that the downstream training was successful at a step 310. When the downstream training is not successful, microprocessor 68 determines whether the process indicates that the downstream direction cannot be trained at any transmission rate, called a "train failure," at a step 312. If the process indicates a train failure, the current training session fails at a step 314. DSL modem 24 cannot be trained at any transmission rate and have an acceptable signal quality. If the process does not indicate a train failure at step 312, the process has modified the current upstream and/or the downstream training parameters. Microprocessor 68 returns to step 304 to retrain DSL modems 18 and 24 using the altered training parameters.

When the downstream process indicates that the training was successful in the downstream direction at step 310, microprocessor 68 processes the upstream training attempt at a step 318. The process is illustrated in FIGS. 7b–7f. Microprocessor 68 determines whether the upstream process indicates that the upstream training was successful at a step 320. When the upstream training is successful, the current upstream and downstream parameters have allowed DSL chipset 54 to successfully train DSL modems 18 and 24 and establish a connection with acceptable signal qualities.

If the upstream training was not successful at step 320, microprocessor 68 determines whether the process indicates a train failure in the upstream direction at a step 324. If the process indicates a train failure, the current training session fails at a step 326. DSL modems 18 and 24 cannot be trained at any transmission rate and have an acceptable signal quality. If the process does not indicate a train failure at step 324, the process has modified the current upstream and/or the downstream parameters. Microprocessor 68 returns to step 304 to retrain DSL modems 18 and 24 using the altered training parameters.

FIGS. 7b through 7f are flowcharts illustrating an example method for processing a training attempt of FIG. 7a. Starting in FIG. 7b at a step 360, microprocessor 68 determines if the training attempt at step 304 timed out. This may include, for example, DSL chipset 54 determining if DSL modem 24 remained in training mode and did not enter data mode. If DSL modem 24 timed out, microprocessor 68 skips to a step 366. If DSL modems 18 and 24 trained and entered data mode, microprocessor 68 locates entries 182 in signal quality table 62 that are identified by the subscriber's provisioned margin at a step 362. This may include, for example, microprocessor 68 determining which table 62 corresponds to the baud in the current upstream or downstream parameters. This may also include microprocessor 68 accessing that table 62 and identifying all entries 182 that are indexed by the subscriber's provisioned margin. For example, as illustrated in FIG. 5, if a subscriber's provisioned margin is twelve, microprocessor 68 will identify entries 182 located in the top row of table 62.

Microprocessor 68 compares the measured signal quality to at least one of the acceptable signal qualities in table 62 at a step 364. In one embodiment, microprocessor 68 compares the measured signal quality to at least one entry 182 in table 62, starting with the entry 182 indexed by the lowest constellation. Microprocessor 68 continues comparing the measured signal quality with entries 182 until microprocessor 68 identifies an entry 182, with the lowest constellation, that exceeds the measured signal quality. The results of the comparison determine whether this training attempt has been successful. If the measured signal quality exceeds all entries 182 in table 62, the measured signal quality is too high, and DSL modem 24 will not be trained using the current baud. When the constellation of the identified entry 182 is less than the constellation of the current training attempt, the training attempt is unsuccessful, but it may be successful at the lower constellation. If the constellation of the identified entry 182 exceeds the constellation of the current training attempt, the training attempt is successful, but DSL modems 18 and 24 may also successfully train at the higher constellation. When the measured signal quality and entry 182 in table 62 have the same constellation, the current transmission rate is the best rate available in the current baud.

Microprocessor 68 next determines if parameters of a previously successful upstream attempt should be restored at a step 366. This may include determining if this is a downstream training attempt that failed, the prior downstream attempt succeeded, and the current upstream parameters differ from saved parameters in memory 56. If all three conditions are met, a previous training attempt succeeded in the downstream direction, but a change to the upstream parameters caused the downstream direction to now fail. Microprocessor 68 retrieves the saved upstream parameters from memory 56 at a step 368. Using the baud from the saved parameters, microprocessor 68 sets the current upstream parameters to the lowest transmission rate and constellation that are available in that baud at a step 370. Microprocessor 68 clears the saved upstream parameters from memory 56 at a step 372, and microprocessor 68 returns to the method of FIG. 7a indicating that retraining is needed at a step 373.

If any of the conditions in step 366 is not met, microprocessor 68 determines whether DSL modem 24 timed out or whether the measured signal quality exceeded all of the entries 182 in table 62 at a step 374. In this case, DSL modem 24 did not train properly, or DSL modems 18 and 24 did train but the resulting signal quality was too high for any transmission rate in the current baud. If either condition is met, microprocessor 68 performs the method illustrated in FIG. 7c. If neither condition is met, microprocessor 68 determines if the constellation of the identified entry 182 in table 62 from step 364 equals the constellation of the current training attempt at a step 376. If so, the current training parameters define the best transmission rate available in the current baud, and microprocessor 68 performs the method illustrated in FIG. 7d.

Microprocessor 68 determines whether the constellation of the identified entry 182 exceeds the constellation of the current training attempt at a step 378. When that occurs, the current training attempt is successful, but a higher transmission rate may be available in the current baud. Microprocessor 68 performs the method illustrated in FIG. 7e. Otherwise, microprocessor 68 performs the method illustrated in FIG. 7f. The current training attempt has failed, but a lower transmission rate in the current rate may succeed.

Figure 7C:
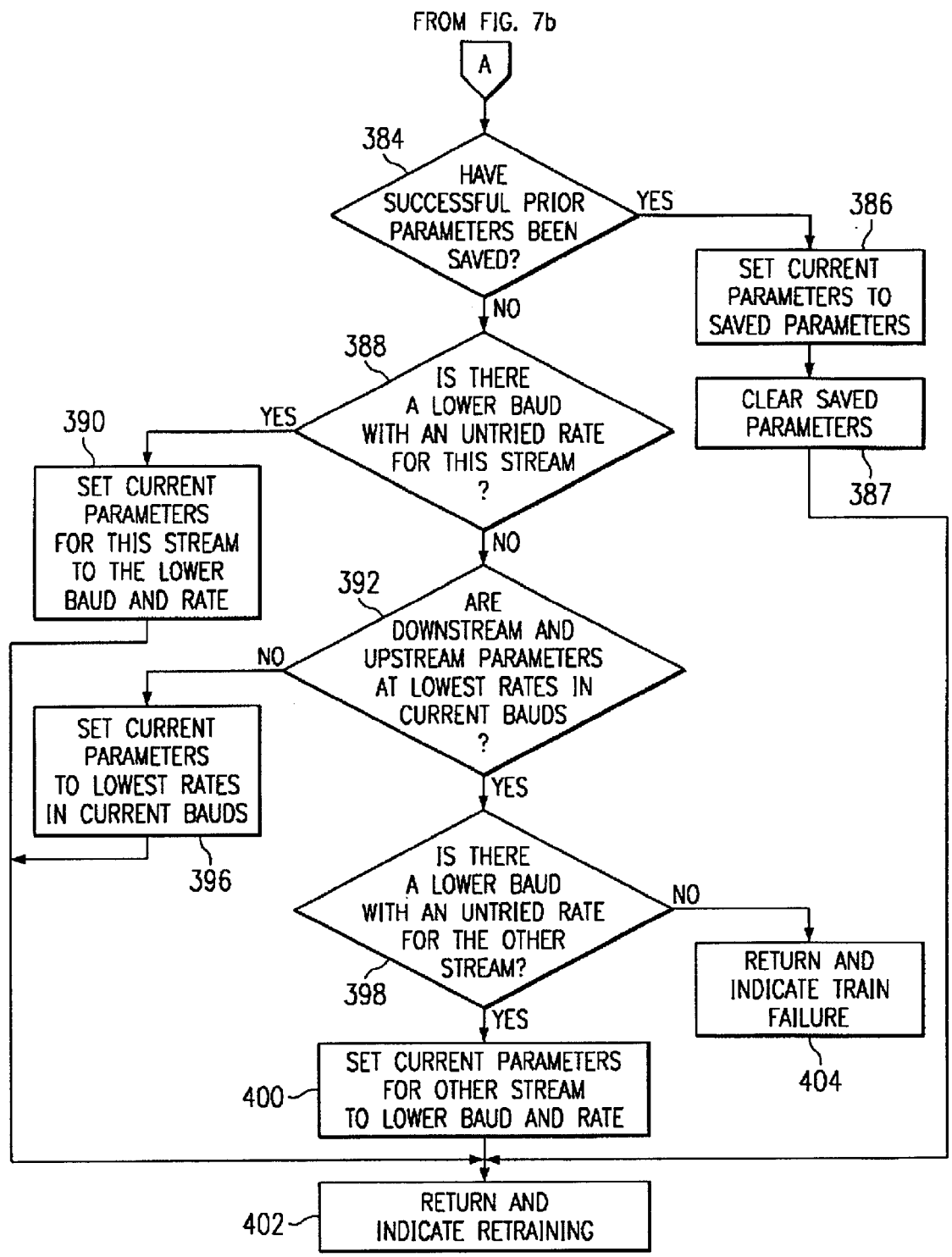

FIG. 7c is a flowchart illustrating an example method for determining another transmission rate for DSL modem 24 when no transmission rates are available in a current baud. Microprocessor 68 determines whether a prior training attempt was successful at a step 384. This may include, for example, accessing memory 56 to locate any saved training parameters. If training parameters are saved in memory 56, microprocessor 68 sets the current parameters to the saved parameters at a step 386. Microprocessor 68 clears the saved parameters from memory 56 at a step 387, and microprocessor 68 returns to FIG. 7a indicating that retraining is needed at a step 402.

If no saved parameters were located at step 384, microprocessor 68 attempts to alter the current upstream and/or downstream parameters. Microprocessor 68 determines whether a lower baud with an untried transmission rate exists for the direction (upstream or downstream) currently being processed at a step 388. If a lower baud and untried transmission rate exist, microprocessor 68 sets the current parameters to that baud and transmission rate at a step 390. Microprocessor 68 returns to FIG. 7a indicating that retraining is needed at step 402.

If no lower baud and/or untried rate exist for this stream, microprocessor 68 determines whether both the upstream and downstream parameters are at the lowest possible rates in their current upstream and downstream bauds at a step 392. If not, microprocessor 68 sets the current parameters to the lowest possible rates in their current bauds at a step 396. Microprocessor 68 returns to FIG. 7a indicating that retraining is needed at step 402.

When both the upstream and downstream parameters are at the lowest possible rates in their current bauds, microprocessor 68 checks whether a lower baud with an untried transmission rate exists for the direction (upstream or downstream) not currently being processed at a step 398. If so, microprocessor 68 sets the current parameters for the other direction to the lower baud and rate. Microprocessor 68 returns to FIG. 7a indicating that retraining is needed at step 402.

If no lower baud and rate exist for the other direction, microprocessor 68 returns to FIG. 7a and indicates a train failure. In this case, both the upstream and downstream parameters are at the lowest possible settings, but DSL modems 18 and 24 still cannot train successfully.

Figure 7D:
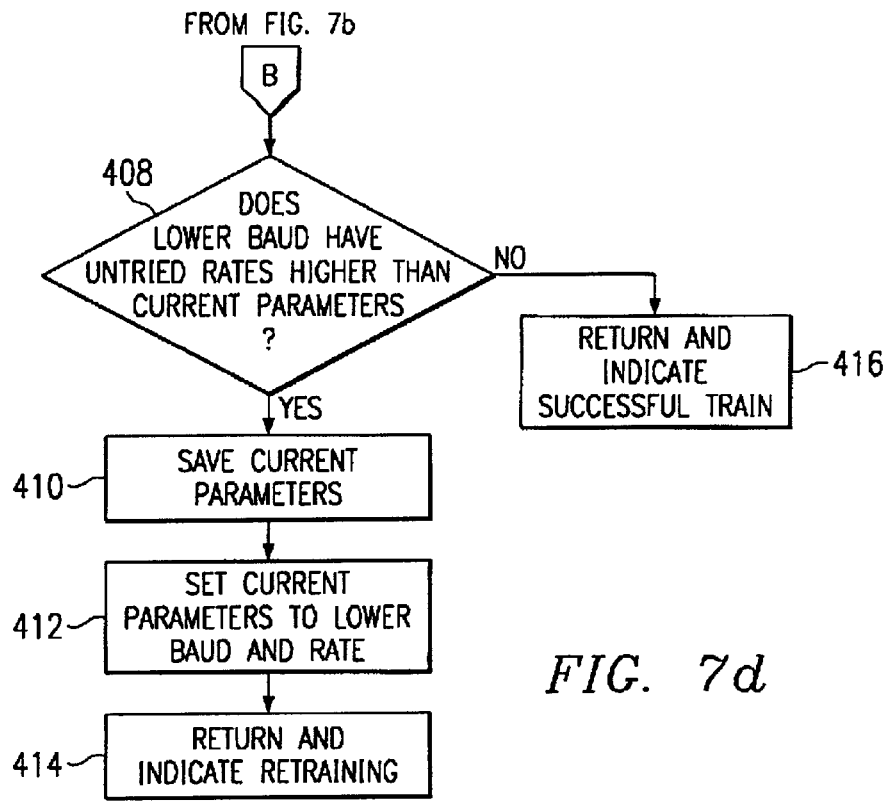

FIG. 7d is a flowchart illustrating an example method for determining another transmission rate for DSL modem 24 when a current transmission rate is the best available rate in a current baud. Microprocessor 68 determines whether a lower baud has an untried transmission rate that is greater than the current parameters at a step 408. The transmission rates in the bauds may overlap, so a higher transmission rate in a lower baud may be used even though the current attempt has succeeded.

If a lower baud with a higher untried transmission rate exists, microprocessor 68 saves the current training parameters at a step 410. This may include, for example, microprocessor 68 saving the current parameters in memory 56. Microprocessor 68 sets the current training parameters to the lower baud and untried transmission rate at a step 412. Microprocessor 68 returns to FIG. 7a and indicates that retraining is needed at a step 414.

If no lower baud and/or untried transmission rate exists, microprocessor 68 returns to FIG. 7a and indicates a successful train at a step 416. The current training parameters allow DSL modems 18 and 24 to train and establish a connection with an acceptable signal quality.

Figure 7E:
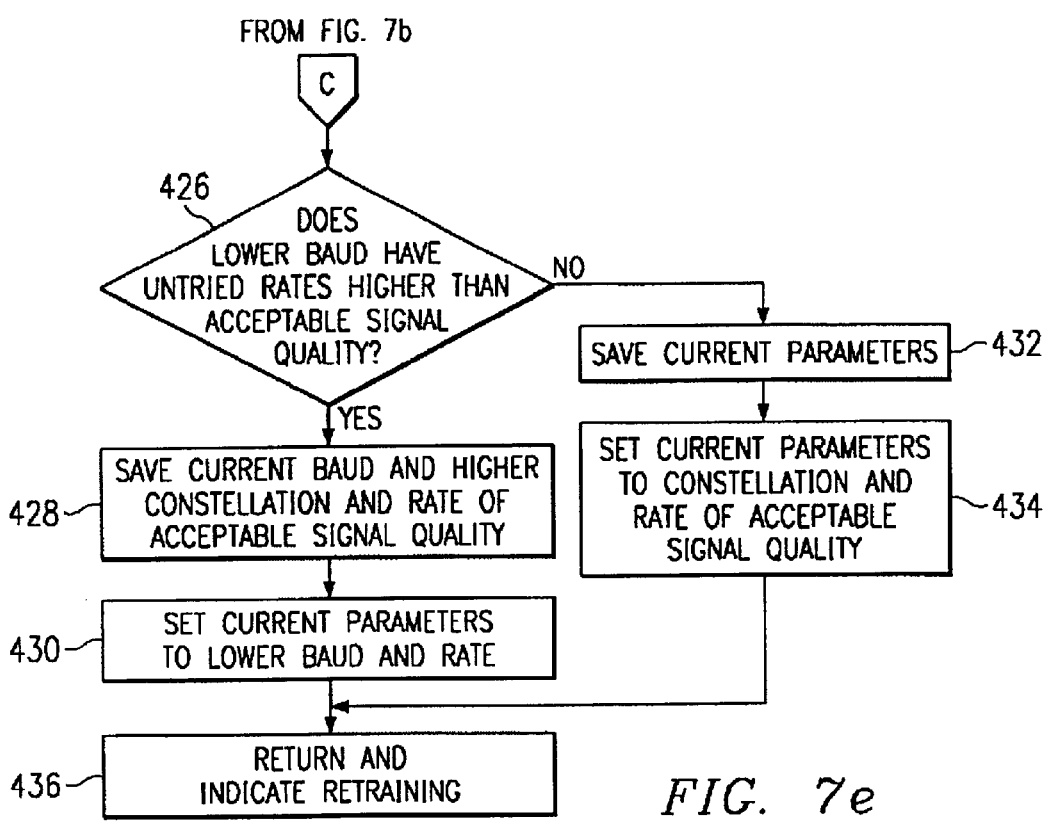

FIG. 7e is a flowchart illustrating an example method for determining another transmission rate for DSL modem 24 when a higher transmission rate may be available in a current baud. Microprocessor 68 determines whether a lower baud has an untried transmission rate and constellation that are greater than the constellation of the identified entry 182 in table 62 at a step 426. The lower baud may have an untried transmission rate that is greater than the higher transmission rate in the current baud.

If a lower baud with a higher untried transmission rate exists, microprocessor 68 saves the current baud and the higher constellation and transmission rate of the identified entry 182 at a step 428. Microprocessor 68 sets the current training parameters to the lower baud and untried transmission rate at a step 430. Microprocessor 68 returns to FIG. 7a and indicates that retraining is needed at a step 436.

If no lower baud and/or untried transmission rate exists, microprocessor 68 saves the current training parameters at a step 432. Microprocessor 68 then sets the current training parameters to the higher constellation and transmission rate in the current baud. Microprocessor 68 returns to FIG. 7a and indicates that retraining is needed at step 436.

Figure 7F:
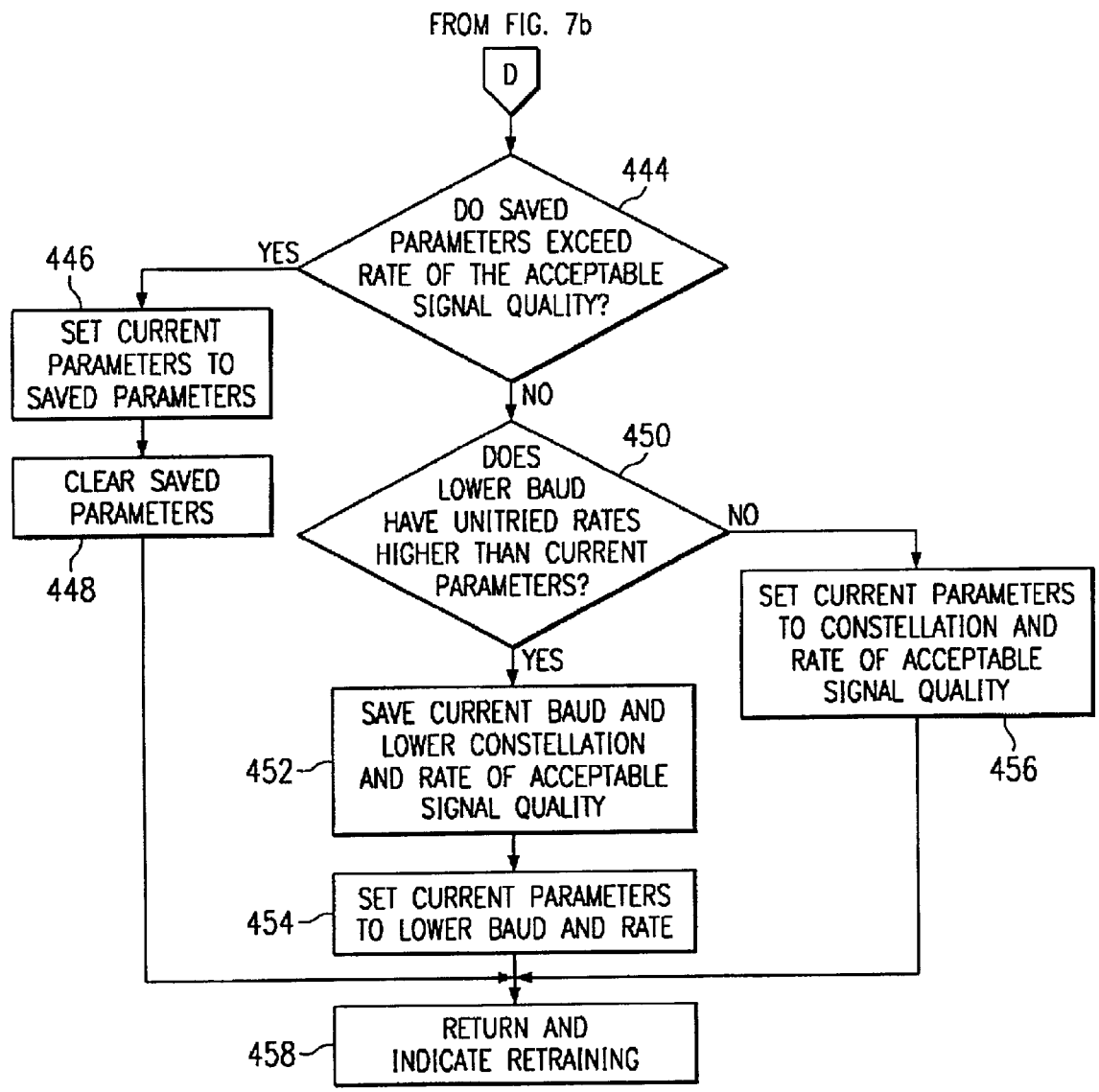

FIG. 7f is a flowchart illustrating an example method for determining another transmission rate for DSL modem 24 when a lower transmission rate may be available in a current baud. Microprocessor 68 determines whether saved parameters in memory 56 exceed the transmission rate of the identified entry 182 in table 62 at a step 444. Although an acceptable transmission rate may be available in the current baud, a prior training attempt may have established an even better transmission rate. If so, microprocessor 68 sets the current training parameters to the saved parameters at a step 446. Microprocessor 68 clears the saved parameters from memory 56 at a step 448, and microprocessor 68 returns to FIG. 7a indicating that retraining is needed at a step 458.

If no saved parameters exceed the lower transmission rate in the current baud, microprocessor 68 determines whether a lower baud has an untried transmission rate and constellation that are greater than the constellation of the identified entry 182 in table 62 at a step 450. The lower baud may have an untried transmission rate that is greater than the lower transmission rate in the current baud.

If a lower baud with a higher untried transmission rate exists, microprocessor 68 saves the current baud and the lower constellation and transmission rate of the identified entry 182 at a step 452. Microprocessor 68 sets the current training parameters to the lower baud and untried transmission rate at a step 454. Microprocessor 68 returns to FIG. 7a and indicates that retraining is needed at a step 458.

If no lower baud and/or untried transmission rate exists, microprocessor 68 sets the current training parameters to the lower constellation and transmission rate in the current baud at a step 456. Microprocessor 68 returns to FIG. 7a and indicates that retraining is needed at step 458.

Figure 7G:
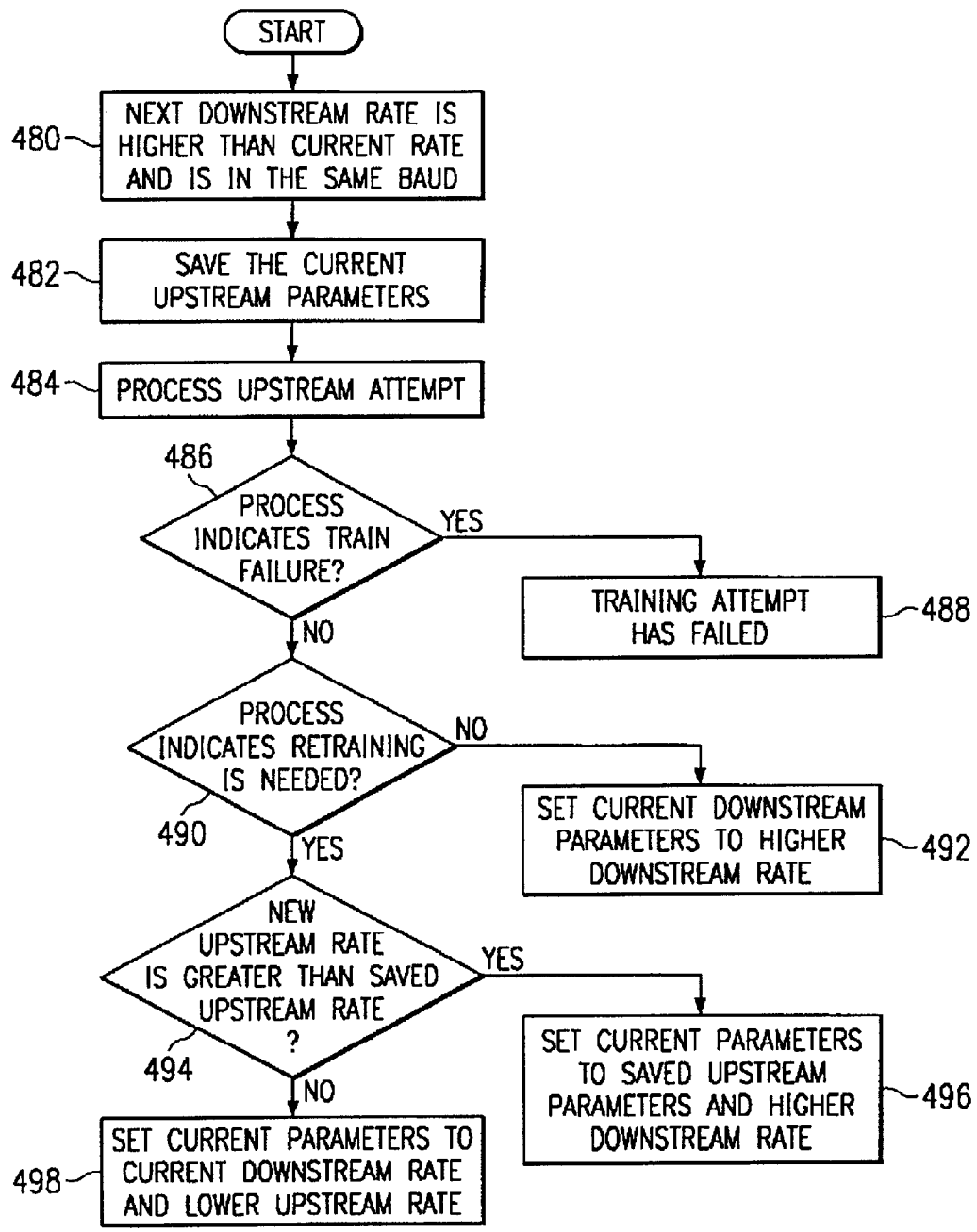

FIG. 7g is a flowchart illustrating an example method for processing an unsuccessful downstream training attempt of FIG. 7a. The method illustrated in FIG. 7a processes the downstream training attempt first and then the upstream training attempt. The method illustrated in FIG. 7g illustrates one example where it may be desirable to process the upstream attempt first.

Microprocessor 68 determines, at a step 480, that the processing of a downstream training attempt at step 308 indicated that retraining is needed after selecting a higher transmission rate in the same downstream baud. Microprocessor 68 saves the current upstream training parameters at a step 482. Microprocessor 68 processes the upstream attempt at a step 484. This may include, for example, microprocessor 68 executing the method illustrated in FIGS. 7b–7f. Microprocessor 68 determines if the process indicates a train failure at a step 486. If a train failure is indicated, the current training attempt fails at a step 488. DSL modems 18 and 24 may not be trained and establish a connection with an acceptable signal quality.

If the process does not indicate a train failure, microprocessor 68 determines if the process indicates a retraining is needed at a step 490. If a retraining is not needed, the upstream training attempt succeeded. Microprocessor 68 sets the current downstream parameters to the higher transmission rate detected in step 480. DSL chipset 54 then attempts to train DSL modem 24 using the higher downstream rate at step 308.

If the process indicates retraining is needed at step 490, microprocessor 68 determines if the retraining is needed because a higher upstream rate was found at a step 494. If so, microprocessor 68 sets the current parameters to the higher downstream rate and the saved upstream parameters. A higher upstream rate may be possible, but the downstream rate is processed first to determine if the higher downstream rate is possible. If the retraining is needed because the upstream rate was lowered by the process at step 494, microprocessor 68 sets the current parameters to the current downstream rate and the lower upstream rate. The higher downstream rate detected at step 480 may not support the lower upstream rate, so the higher downstream rate is not processed yet.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for training a modem, comprising:
    selecting a transmission rate from one of a plurality of bauds, each baud identifying at least one transmission rate;
    attempting to train the modem at the transmission rate;
    measuring a signal quality after the modem trains;
    accessing a table of acceptable signal qualities, the table corresponding to the baud of the transmission rate;
    comparing the measured signal quality to at least one acceptable signal quality identified by a provisioned margin in the table to determine if the measured signal quality is acceptable;
    wherein the transmission rate comprises a first transmission rate in a downstream direction, further comprising:
    selecting a second transmission rate from one of a second plurality of bauds, each of the second plurality of bauds identifying at least one transmission rate, the second transmission rate comprising a transmission rate in an upstream direction; and
    attempting to train the modem at the first and second transmission rates.

2. The method of claim 1, wherein the transmission rate comprises a maximum transmission rate provisioned to a subscriber.

3. The method of claim 1, wherein the table of signal qualities comprises a plurality of entries, each entry identified by a margin and a constellation.

4. The method of claim 1, wherein comparing the measured signal quality to at least one acceptable signal quality identified by a provisioned margin in the table comprises:
    comparing the measured signal quality to at least one of the acceptable signal qualities in the table identified by the provisioned margin, each of the acceptable signal qualities also identified by a different constellation; and
    determining whether any of the acceptable signal qualities exceeds the measured signal quality.

5. The method of claim 1, wherein determining whether any of the acceptable signal qualities exceeds the measured signal quality comprises identifying the acceptable signal quality with a lowest constellation that exceeds the measured signal quality.

6. The method of claim 5, wherein the transmission rate comprises a first transmission rate, and further comprising:
    identifying the constellation of the identified acceptable signal quality;
    selecting a second transmission rate, where the second transmission rate is in the same baud as the first transmission rate and has a constellation that is equal to the constellation of the identified acceptable signal quality; and
    attempting to train the modem at the second transmission rate.

7. The method of claim 1, wherein the transmission rate comprises a first transmission rate, and further comprising:
   selecting a second transmission rate from one of the bauds; and
   attempting to train the modem at the second transmission rate.

8. The method of claim 7, wherein the second transmission rate comprises a lower transmission rate in the same baud as the first transmission rate.

9. The method of claim 7, wherein the second transmission rate comprises a higher transmission rate in the same baud as the first transmission rate.

10. The method of claim 7, wherein the second transmission rate comprises a transmission rate selected from a lower baud.

11. The method of claim 1, wherein the transmission rate comprises a transmission rate in a downstream direction.

12. The method of claim 1, wherein the transmission rate comprises a transmission rate in an upstream direction.

13. The method of claim 1, wherein the modem comprises a digital subscriber line modem.

14. A system for training a modem, comprising:
   a computer readable medium; and
   software encoded on the computer readable medium, the software operable when executed to:
     select a transmission rate from one of a plurality of bauds, each baud identifying at least one transmission rate;
     communicate the transmission rate to a chipset, the chipset operable to attempt to train the modem at the transmission rate;
     receive a measured signal quality from the chipset after the modem trains;
     access a table of acceptable signal qualities, the table corresponding to the baud of the transmission rate;
     compare the measured signal quality to at least one acceptable signal quality identified by a provisioned margin in the table to determine if the measured signal quality is acceptable;
     wherein comparing the measured signal quality to at least one acceptable signal quality identified by a provisioned margin in the table comprises:
       comparing the measured signal quality to at least one of the acceptable signal qualities in the table identified by the provisioned margin, each of the acceptable signal qualities also identified by a different constellation; and
       determining whether any of the acceptable signal qualities exceeds the measured signal quality.

15. The system of claim 14 wherein the transmission rate comprises a maximum transmission rate provisioned to a subscriber.

16. The system of claim 14, wherein the table of signal qualities comprises a plurality of entries, each entry identified by a margin and a constellation.

17. The system of claim 14, wherein determining whether any of the acceptable signal qualities exceeds the measured signal quality comprises identifying the acceptable signal quality with a lowest constellation that exceeds the measured signal quality.

18. The system of claim 17, wherein the transmission rate comprises a first transmission rate, and wherein the software is further operable to:
   identify the constellation of the identified acceptable signal quality;
   select a second transmission rate, where the second transmission rate is in the same baud as the first transmission rate and has a constellation that is equal to the constellation of the identified acceptable signal quality; and
   communicate the second transmission rate to the chipset, the chipset operable to attempt to train the modem at the second transmission rate.

19. The system of claim 14, herein the transmission rate comprises a first transmission rate, and wherein the software is further operable to:
   select a second transmission rate from one of the bauds; and
   communicate the second transmission rate to the chipset, the chipset operable to attempt to train the modem at the second transmission rate.

20. The system of claim 19, wherein the second transmission rate comprises a lower transmission rate in the same baud as the first transmission rate.

21. The system of claim 19, wherein the second transmission rate comprises a higher transmission rate in the same baud as the first transmission rate.

22. The system of claim 19, wherein the second transmission rate comprises a transmission rate selected from a lower baud.

23. The system of claim 14, wherein the transmission rate comprises a transmission rate in a downstream direction.

24. The system of claim 14, wherein the transmission rate comprises a transmission rate in an upstream direction.

25. The system of claim 14, wherein the transmission rate comprises a first transmission rate in a downstream direction;
   wherein the software is further operable to select a second transmission rate from one of a second plurality of bauds, each of the second plurality of bauds identifying at least one transmission rate, the second transmission rate comprising a transmission rate in an upstream direction; and
   wherein communicating the transmission rate to the chipset comprises communicate the first and second transmission rates to the chipset, the chipset operable to attempt to train the modem at the first and second transmission rates.

26. The system of claim 14, wherein the chipset comprises a digital subscriber line chipset.

27. A modem, comprising:
   an interface operable to communicate over a subscriber line;
   a memory operable to store at least one table of acceptable signal qualities;
   a chipset coupled to the interface, the chipset operable to train the modem and measure a signal quality after the modem trains; and
   a processor coupled to the chipset and the memory, the processor operable to:
     select a transmission rate from one of a plurality of bauds, each baud identifying at least one transmission rate;
     communicate the transmission rate to the chipset, the chipset operable to attempt to train the modem at the transmission rate;
     receive a measured signal quality from the chipset after the modem trains;
     access the table of acceptable signal qualities, the table corresponding to the baud of the transmission rate;
     compare the measured signal quality to at least one acceptable signal quality identified by a provisioned margin in the table to determine if the measured signal quality is acceptable;
     wherein comparing the measured signal quality to at least one acceptable signal quality identified by a provisioned margin in the table comprises:
       comparing the measured signal quality to at least one of the acceptable signal qualities in the table identified by the provisioned margin, each of the acceptable signal qualities also identified by a different constellation; and determining whether any of the acceptable signal qualities exceeds the measured signal quality.

28. The modem of claim 27, wherein the transmission rate comprises a maximum transmission rate provisioned to a subscriber.

29. The modem of claim 27, wherein the table of signal qualities comprises a plurality of entries, each entry identified by a margin and a constellation.

30. The modem of claim 27, wherein determining whether any of the acceptable signal qualities exceeds the measured signal quality comprises identifying the acceptable signal quality with a lowest constellation that exceeds the measured signal quality.

31. The modem of claim 30, wherein the transmission rate comprises a first transmission rate, and wherein the processor is further operable to:
   identify the constellation of the identified acceptable signal quality;
   select a second transmission rate, where the second transmission rate is in the same baud as the first transmission rate and has a constellation that is equal to the constellation of the identified acceptable signal quality; and
   communicate the second transmission rate to the chipset, the chipset operable to attempt to train the modem at the second transmission rate.

32. The modem of claim 27, wherein the transmission rate comprises a first transmission rate, and wherein the processor is further operable to:
   select a second transmission rate from one of the bauds; and
   communicate the second transmission rate to the chipset, the chipset operable to attempt to train the modem at the second transmission rate.

33. The modem of claim 32, wherein the second transmission rate comprises a lower transmission rate in the same baud as the first transmission rate.

34. The modem of claim 32, wherein the second transmission rate comprises a higher transmission rate in the same baud as the first transmission rate.

35. The modem of claim 32, wherein the second transmission rate comprises a transmission rate selected from a lower baud.

36. The modem of claim 27, wherein the transmission rate comprises a transmission rate in a downstream direction.

37. The modem of claim 27, wherein the transmission rate comprises a transmission rate in an upstream direction.

38. The modem of claim 27, wherein the transmission rate comprises a first transmission rate in a downstream direction;
   wherein the processor is further operable to select a second transmission rate from one of a second plurality of bauds, each of the second plurality of bauds identifying at least one transmission rate, the second transmission rate comprising a transmission rate in an upstream direction; and
   wherein the processor is operable to communicate the first and second transmission rates to the chipset, the chipset operable to attempt to train the modem at the first and second transmission rates.

39. The modem of claim 27, wherein the chipset comprises a digital subscriber line chipset.

40. A modem, comprising:
   means for communicating over a subscriber line;
   means for storing at least one table of acceptable signal qualities;
   means for selecting a transmission rate from one of a plurality of bauds, each baud identifying at least one transmission rate;
   means for attempting to train the modem at the transmission rate;
   means for measuring the signal quality after the modem trains;
   means for accessing the table of acceptable signal qualities, the table corresponding to the baud of the transmission rate;
   means for comparing the measured signal quality to at least one acceptable signal quality identified by a provisioned margin in the table to determine if the measured signal quality is acceptable;
   wherein comparing the measured signal quality to at least one acceptable signal quality identified by a provisioned margin in the table comprises:
      comparing the measured signal quality to at least one of the acceptable signal qualities in the table identified by the provisioned margin, each of the acceptable signal qualities also identified by a different constellation; and
      determining whether any of the acceptable signal qualities exceeds the measured signal quality.

41. The modem of claim 40, wherein the transmission rate comprises a maximum transmission rate provisioned to a subscriber.

42. The modem of claim 40, wherein the table of signal qualities comprises a plurality of entries, each entry identified by a margin and a constellation.

43. The modem of claim 40, wherein determining whether any of the acceptable signal qualities exceeds the measured signal quality comprises identifying the acceptable signal quality with a lowest constellation that exceeds the measured signal quality.

44. The modem of claim 43, wherein the transmission rate comprises a first transmission rate, and further comprising:
   means for identifying the constellation of the identified acceptable signal quality; and
   means for selecting a second transmission rate, where the second transmission rate is in the same baud as the first transmission rate and has a constellation that is equal to the constellation of the identified acceptable signal quality.

45. The modem of claim 40, wherein the transmission rate comprises a first transmission rate, and further comprising means for selecting a second transmission rate from one of the bauds.

46. The modem of claim 45, wherein the second transmission rate comprises a lower transmission rate in the same baud as the first transmission rate.

47. The modem of claim 45, wherein the second transmission rate comprises a higher transmission rate in the same baud as the first transmission rate.

48. The modem of claim 45, wherein the second transmission rate comprises a transmission rate selected from a lower baud.

49. The modem of claim 40, wherein the transmission rate comprises a transmission rate in a downstream direction.

50. The modem of claim 40, wherein the transmission rate comprises a transmission rate in an upstream direction.

51. The modem of claim 40, wherein the transmission rate comprises a first transmission rate in a downstream direction;
   further comprising means for selecting a second transmission rate from one of a second plurality of bauds, each of the second plurality of bauds identifying at least one transmission rate, the second transmission rate comprising a transmission rate in an upstream direction; and
   wherein the means for attempting to train the modem uses the first and second transmission rates.

* * * * *

UNITED STATES PATENT AND TRADEMARK OFFICE
CERTIFICATE OF CORRECTION

PATENT NO. : 6,704,351 B1
DATED : March 9, 2004
INVENTOR(S) : Ott et al.

It is certified that error appears in the above-identified patent and that said Letters Patent is hereby corrected as shown below:

Column 16,
Line 1, after "14,", delete "herein" and insert -- wherein --.
Line 31, after "comprises", delete "communicate" and insert -- communicating --.

Signed and Sealed this

Thirty-first Day of August, 2004

JON W. DUDAS
*Director of the United States Patent and Trademark Office*